G. E. HUMPHRIES.
SCAFFOLDING.
APPLICATION FILED FEB. 27, 1909.
Reissued Nov. 9, 1909. 13,037.
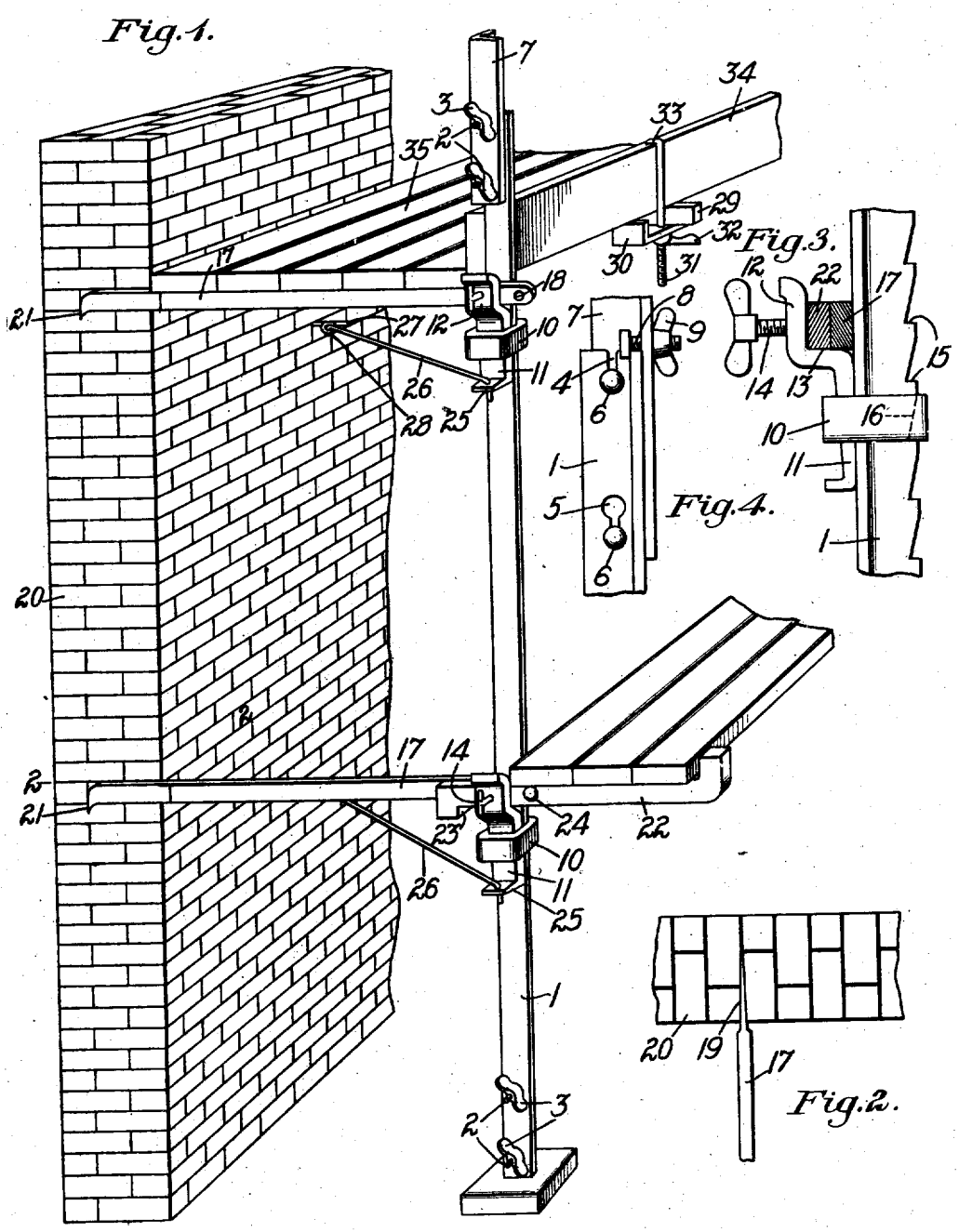
Witnesses:
Robert H. Kammler.
Horace F. Crossman.
Inventor:
George Edward Humphries,
by Emery & Booth
Att'ys.
ANDREW B. GRAHAM CO., PHOTO-LITHOGRAPHERS, WASHINGTON, D. C.

UNITED STATES PATENT OFFICE.

GEORGE EDWARD HUMPHRIES, OF WELLINGTON, NEW ZEALAND.

SCAFFOLDING.

13,037. Specification of Reissued Letters Patent. Reissued Nov. 9, 1909.

Original application filed September 18, 1907, Serial No. 393,467. Renewed August 10, 1908, Serial No. 447,825. Original No. 898,368, dated September 8, 1908. Application for reissue filed February 27, 1909. Serial No. 480,489.

*To all whom it may concern:*

Be it known that I, George E. Humphries, a subject of the King of Great Britain and Ireland, residing at Wellington, in the Dominion of New Zealand, have invented certain new and useful Improvements in Scaffolding, of which the following is a specification.

My invention relates to improvements in scaffolding, and it consists in the constructions, combinations and arrangements herein described and claimed.

An object of my invention is to provide an improved construction by which scaffold platforms can be rigidly and strongly secured in any desired positions on building walls, or other similar supports.

A further object of my invention is to provide a system of scaffolding, capable of being conveniently attached to a building wall, and in which the scaffold platforms can be quickly adjusted to provide any desired change of position.

A further object of my invention is to provide a simple construction of scaffolding, adapted to be readily assembled in position and to strongly and rigidly support the adjustable scaffold platforms.

In the accompanying drawings, forming a part of this application and in which similar reference numerals indicate corresponding parts in the several views:—Figure 1 is a detail perspective view illustrating one embodiment of my invention; Fig. 2 is a fragmentary plan view on the line 2—2 of Fig. 1; Fig. 3 is a detail side elevation of the adjustable clip and floor bar support, illustrating a slight modification in which the upright standard is provided with a series of serrations; and Fig. 4 is a detail side elevation showing a preferred means of detachably connecting sections of the upright standards.

Referring to the drawings, 1 indicates an upright standard having a pair of bolts 2 extending through one end thereof and carrying wing nuts 3. The other end of said standard is provided with an end slot 4 and a key-hole slot 5 for receiving the heads 6 of the bolts 2 carried by another standard 7 when it is desired to secure the latter in position on the standard 1. The standard 7 is preferably provided with a bolt 8 adapted to rest on the top of the standard 1, and provided with a wing nut 9 for clamping it in position.

The standards are shown formed of angle iron with the securing bolt 8 extending at right angles to the securing bolts 6; thereby providing a quickly detachable means for strongly and rigidly securing the standards together.

A plurality of bands 10 are slidably mounted on the standard to constitute adjustable clips. A downwardly tapered wedge 11 is held by each clip seated against the adjacent faces of the standard for locking said clip in position upon forcing said wedge downward in the latter as by the superposed weight thereon. The upper end of each wedge carries an offset portion 12 to provide a seat 13 for receiving supporting bars; said offset portion having a screw 14 threaded therethrough for securing the bars on said seat.

Fig. 3 shows a construction in which one web of the angle bar is serrated to provide a series of horizontal shoulders 15 and with a clip 10 provided with an inclined interior face 16 for fitting snugly against the inclined faces of said serrations when the clip is wedged in position. This modification provides a construction in which the clips are positively locked against accidental shifting under the action of excessive loads or shocks on the scaffold platform.

A floor or putlog bar 17 is supported on the seat 13 of the wedge and has its outer end extending somewhat beyond the seat and provided with a perforation 18. As shown especially in Figs. 1 and 2, the floor bar 17 has its greatest transverse dimension vertically arranged and has the vertical faces of its inner end tapered at 19 for ready insertion a substantial distance into the building wall 20, and provided with a downwardly extending pointed lug or anchoring portion 21 integral with the bar for securely anchoring said floor bar to the building wall.

An extension bar 22 is supported in the seat 13 against the floor bar, and overlaps the latter throughout a portion of its length; the inner end of said extension bar being provided with a lug 23 for engaging the bottom edge of the floor bar to prevent relative tilting of said bars on the seat 13. The extension bar may carry a bolt 24 in position to extend through the opening 18 in the floor bar for further locking said bars rigidly together.

The wedge 11 carries a perforated lug 25 at its lower end, which prevents accidental displacement, or withdrawal, of said wedge from the clip 10. A tie rod 26 is hooked through the perforation in said lug 25 and extended back at an angle to the building wall 20, where it is secured by any suitable means. I prefer to so secure the inner end of the tie rod by an anchor pin 27 provided with an eye 28 intermediate of its ends. This provides a convenient construction by which the anchor pin can be readily driven into the building wall and removed therefrom. If desired, auxiliary floor or putlog bars 29 may be secured to the building wall between adjacent floor bars 17. The outer ends of said bars are supported on a U-shaped bracket 30 which is adjusted along a screw 31 by a hand nut 32. The upper end of said screw being provided with a pointed hook 33 for firmly securing and supporting it on the top edge of a fender board 34 of the scaffold platform 35. I prefer to form the U-shaped bracket of different widths on the two sides of the screw 31, whereby auxiliary bars 29 of two different standard sizes can be snugly seated on said bracket.

I have illustrated and described preferred and satisfactory constructions, but, obviously, changes could be made within the spirit and scope of my invention.

Having thus described my invention, what I claim as new therein and desire to secure by Letters Patent is:—

1. An integral scaffold putlog bar having its greatest transverse dimension vertically arranged and having a substantial portion of its length formed for insertion into the mortar space of a wall.

2. An integral scaffold putlog bar having its greatest transverse dimension vertically arranged, a substantial portion of its length being formed for insertion into the mortar space of a wall, and anchoring means to retain said bar in place when in normal position.

3. An integral scaffold putlog bar having its greatest transverse dimension vertically arranged, a substantial portion of its length being formed for insertion into the mortar space of a wall, and an anchoring lug engaging said wall when the bar is in normal position.

4. In a scaffolding the combination of an integral scaffold putlog bar having its greatest transverse dimension vertically arranged and having a substantial portion of its length formed for insertion into the mortar space of a wall, a supporting standard, and frictional means for connecting said putlog bar to said standard in any adjusted position of said bar and standard, said means being rendered effective by the superposed weight thereon.

5. In a scaffolding the combination of an integral scaffold putlog bar having its greatest transverse dimension vertically arranged and having a substantial portion of its length formed for insertion into the mortar space of a wall, anchoring means to retain said bar in place when in normal position, a supporting standard, and frictional means for connecting said putlog bar to said standard at any elevation and at any distance from said wall, said means being rendered effective by the superposed weight thereon.

6. In a scaffolding the combination of an integral scaffold putlog bar having its greatest transverse dimension vertically arranged, a substantial portion of its length being formed for insertion into the mortar space of a wall and an anchoring lug on said bar engaging said wall when the bar is in normal position, a supporting standard, frictional means for connecting said putlog bar to said standard in any adjusted position of said bar and standard, said means being rendered effective by the superposed weight thereon, and a tie-rod connecting said standard with said wall.

7. In scaffolding, the combination of an upright standard, clips adjustably mounted on said standard, floor bars provided with means for securing them to a support, extension bars overlapping said floor bars adjacent said standards, shiftable means carried by said clips for locking the latter in their adjusted positions, and seats on said shiftable means for supporting the overlapping portions of said floor bars and extension bars, whereby said clips will be locked by the weight on said bars, substantially as described.

8. In scaffolding, the combination of an upright standard, clips adjustably mounted on said standard, floor bars provided with means for securing them to a support, extension bars overlapping said floor bars adjacent said standards, lugs carried by the inner ends of said extension bars for engaging the bottoms of said floor bars, shiftable means carried by said clips for locking the latter in their adjusted positions, and seats on said shiftable means for supporting the overlapping portions of said floor bars and extension bars, whereby said clips will be locked by the weight on said bars, substantially as described.

9. In scaffolding, the combination of an upright standard, clips adjustably mounted on said standard, floor bars provided with means for securing them to a support, extension bars overlapping said floor bars adjacent said standards, wedges slidably carried by said clips for engaging said standards, and seats on the upper ends of said wedges for supporting the overlapping portions of said floor bars and extension bars, substantially as described.

10. In scaffolding, the combination of an upright standard provided with a series of horizontal shoulders, clips adjustably mounted on said standard for engagement with said shoulders, floor bars provided with means for securing them to a support, extension bars overlapping said floor bars adjacent said standards, wedges slidably carried by said clips for engaging said standards, and seats on the upper ends of said wedges for supporting the overlapping portions of said floor bars and extension bars, substantially as described.

11. In scaffolding, the combination of an upright standard, clips adjustably mounted on said standard, floor bars provided with means for securing them to a support, extension bars overlapping said floor bars adjacent said standards, wedges slidably carried by said clips for engaging said standards, seats on the upper ends of said wedges for supporting the overlapping portions of said floor bars and extension bars, and means for locking said bars in said seats, substantially as described.

12. In scaffolding, the combination of an upright standard, clips adjustably mounted on said standard, floor bars provided with means for securing their rear ends to a support, shiftable means carried by said clips for locking the latter in their adjusted positions on said standard, seats on said shiftable means for supporting said floor bars, and tie rods extending angularly from said shiftable means to said support, substantially as described.

13. In scaffolding, the combination of an upright standard, clips adjustably mounted on said standard, floor bars provided with means for securing their rear ends to a support, wedges slidably carried by said clip for engaging said standards, seats on said wedges for supporting said floor bars, and tie rods connecting said wedges to said support, substantially as described.

14. In scaffolding, the combination of an upright standard, clips adjustably mounted on said standard, floor bars provided with means for securing their rear ends to a support, wedges slidably carried by said clip for engaging said standard, seats on said wedges for supporting said floor bars, perforated lugs on said wedges for preventing accidental displacement of the latter from said clips, and tie rods connecting said perforated lugs to said support, substantially as described.

15. In scaffolding, the combination of an upright standard, clips adjustably mounted on said standard, floor bars provided with means for securing their rear ends to a support, wedges slidably carried by said clip for engaging said standards, seats on said wedges for supporting said floor bars, perforated lugs on said wedges for preventing accidental displacement of the latter from said clips, tie rods connected at their outer ends to said lugs, and anchor pins provided with eyes intermediate their ends for securing the inner ends of said tie rods to said support, substantially as described.

In testimony whereof, I affix my signature in the presence of two witnesses.

GEORGE EDWARD HUMPHRIES.

Witnesses:

HENRIE H. RAYWARD,
J. J. WATSON.